United States Patent
Sakama et al.

(10) Patent No.: US 7,701,350 B2
(45) Date of Patent: Apr. 20, 2010

(54) IC TAG AND METHOD FOR FABRICATING THE SAME

(75) Inventors: Isao Sakama, Hiratsuka (JP); Minoru Ashizawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 273 days.

(21) Appl. No.: 11/741,012

(22) Filed: Apr. 27, 2007

(65) Prior Publication Data
US 2008/0106412 A1 May 8, 2008

(30) Foreign Application Priority Data
Nov. 6, 2006 (JP) .............................. 2006-299839

(51) Int. Cl.
*G08B 13/14* (2006.01)

(52) U.S. Cl. ................. 340/572.7; 340/572.1; 343/702; 343/700 MS; 235/492

(58) Field of Classification Search ... 340/572.1–572.9, 340/568.2; 342/51; 235/492, 491, 380; 343/702, 700 MS, 795, 793, 873; 257/678; 438/106; 29/600, 592.1, 601
See application file for complete search history.

(56) References Cited

U.S. PATENT DOCUMENTS

| | | | |
|---|---|---|---|
| 6,456,228 B1 * | 9/2002 | Granhed et al. ............... 342/51 |
| 7,036,741 B2 * | 5/2006 | Usami et al. .................. 235/492 |
| 7,201,328 B2 * | 4/2007 | Usami et al. .................. 235/492 |
| 7,256,739 B2 * | 8/2007 | Usami .................. 343/700 MS |
| 7,365,686 B2 * | 4/2008 | Sakama et al. ......... 343/700 MS |
| 7,405,664 B2 * | 7/2008 | Sakama et al. ........... 340/572.7 |
| 7,508,347 B2 * | 3/2009 | Sakama et al. ........ 343/700 MS |
| 7,523,541 B2 * | 4/2009 | Sakama et al. ................ 29/600 |
| 7,535,365 B2 * | 5/2009 | Sakama et al. ........... 340/572.7 |
| 7,586,446 B2 * | 9/2009 | Sakama et al. ............... 343/702 |
| 7,592,914 B2 * | 9/2009 | Sakama et al. ........... 340/572.1 |
| 2004/0026519 A1 * | 2/2004 | Usami et al. ................. 235/492 |
| 2004/0134460 A1 * | 7/2004 | Kino et al. ............... 123/198 E |
| 2005/0012674 A1 * | 1/2005 | Takei .......................... 343/767 |
| 2005/0134460 A1 * | 6/2005 | Usami ..................... 340/572.7 |
| 2005/0275539 A1 * | 12/2005 | Sakama et al. ........... 340/572.7 |
| 2006/0001138 A1 * | 1/2006 | Sakama et al. ............... 257/678 |
| 2006/0244604 A1 * | 11/2006 | Sakama et al. ........... 340/572.7 |
| 2006/0244605 A1 * | 11/2006 | Sakama et al. ........... 340/572.7 |
| 2006/0267843 A1 * | 11/2006 | Sakama et al. ........ 343/700 MS |
| 2006/0290512 A1 * | 12/2006 | Shanton .................... 340/572.7 |
| 2006/0290514 A1 * | 12/2006 | Sakama et al. ........... 340/572.7 |
| 2007/0057795 A1 * | 3/2007 | Kawai et al. .............. 340/572.7 |
| 2007/0069037 A1 * | 3/2007 | Kawai .......................... 235/492 |

(Continued)

FOREIGN PATENT DOCUMENTS

JP 2005-001692 1/2005

(Continued)

*Primary Examiner*—Davetta W Goins
*Assistant Examiner*—Hoi C Lau
(74) *Attorney, Agent, or Firm*—Mattingly & Malur, P.C.

(57) ABSTRACT

The RFID tag is composed of the first antenna of metal film layer on which the IC chip is mounted and at least one second antenna of metal film layer on which the IC chip is not mounted The metal film layer is formed on the base, and the metal film layer is formed on the base. The metal film layer partially overlaps the metal film layer with the base interposed between them, so that the first antenna and the second antenna are capacitively coupled to each other.

8 Claims, 6 Drawing Sheets

U.S. PATENT DOCUMENTS

2007/0139205 A1* 6/2007 Tanaka et al. ............ 340/572.8
2008/0111760 A1* 5/2008 Sakama et al. ............. 343/860
2008/0172860 A1* 7/2008 Sakama et al. ............... 29/600
2008/0252462 A1* 10/2008 Sakama ................... 340/572.7
2009/0251290 A1* 10/2009 Sakama ..................... 340/10.1

FOREIGN PATENT DOCUMENTS

KR  2006-0113369  11/2006

* cited by examiner

IC TAG AND METHOD FOR FABRICATING THE SAME

INCORPORATION BY REFERENCE

The present application claims priority from Japanese application JP2006-299839 filed on Nov. 6, 2006, the content of which is hereby incorporated by reference into this application.

CROSS-REFERENCE TO RELATED APPLICATION

The present application relates to subject matters described in a co-pending patent application Ser. No. 11/741,003 filed on Apr. 27, 2007 entitled "RADIO FREQUENCY INTEGRATED CIRCUIT TAG AND METHOD OF USING THE RFIC TAG" by the same inventors of the present application and assigned to the assignees of the present application. The disclosures of this co-pending application are incorporated herein by reference.

BACKGROUND OF THE INVENTION

This invention relates to an IC tag incorporating therein an IC chip operable by radio waves, and also to a method for fabricating such an IC tag.

RFID (radio frequency identification) tags have recently come to be widely used in such a way that they are attached to commercial articles, IC cards, etc. so as to control the information on the articles. Such an IC tag mainly consists of an IC chip and an antenna. An external reader/writer can communicate with the IC chip by using radio waves radiated from the antenna so that the reader/writer can interpret such information as ID (identification) data stored in the IC chip. Thus, the data stored in the IC chip can be read out, or additional data can be written in the IC chip, in a non-contact manner, i.e. without any physical contact between the reader/writer and the IC tag.

For example, in one of widely known applications, RFID tags in which specific information is written are attached to commercial articles; a reader/writer reads out the information from or writes other information in, the RFID tags during the process of fabricating or transporting the articles; and the information on the articles provided during the process is administered. The reader/writer mentioned above is so designed as to be able to read out the information as a whole stored in the IC chip of the RFID tag located within an area in which the reader/writer can communicate with the RFID tag. Thus, the RFID tags can improve the efficiency of information administration.

There, however, is a problem with this useful application of the RFID tag. To illustrate such a problematic example, let it be assumed that envelopes are administered by the use of RFID tags. RFID tags are normally stuck at almost the same positions on the envelopes and if these envelopes are piled up one upon another, those RFID tags are also piled up one upon another, with one tag located very closely to another. This close existence of plural RFID tags gives rise to the change in the impedance of the antenna of each RFID tag and to the interference between the radio waves radiated from the antennas of the RFID tags. Consequently, the reader/writer fails to properly read out the information stored in the RFID tags.

To solve such a problem as described above, a technical measure has been proposed wherein a spacer is interposed between two piled RFID tags, the thickness of the spacer being larger than a specific distance at or beyond which the radio waves radiated from the antennas of the two piled RFID tags do not interfere with each other. Reference should be made to, for example, Japanese patent document JP-A-2005-001692, paragraphs 0016 through 0019, FIGS. 1 and 2.

SUMMARY OF THE INVENTION

However, the technique disclosed in JP-A-2005-001692 still has a problem as follows. According to the teaching of JP-A-2005-001692, a spacer must necessarily be inserted between two piled RFID tags so as to eliminate the interference of radio waves. Therefore, when envelopes, each having an RFID tag stuck thereon, are piled up, the pile of the envelopes becomes unnecessarily bulky due to the interposition of spacers, each between two piled envelopes.

Accordingly, the object of this invention is to provide IC tags which suffer little or no interference of radio waves even if they are piled up one upon another.

According to this invention, which has been made to solve such a problem as described above, the RFID tag is provided with a first and a second antennas and the ends of the first and second antennas are coupled via electrostatic capacitance.

As a result, there can be provided RFID tags which suffer little or no interference of radio waves even if they are piled up one upon another.

Other objects, features and advantages of the invention will become apparent from the following description of the embodiments of the invention taken in conjunction with the accompanying drawings.

DESCRIPTION OF THE EMBODIMENTS

Now, embodiments of this invention will be described in detail with reference to the attached drawings.

First Embodiment

Figure 1A:
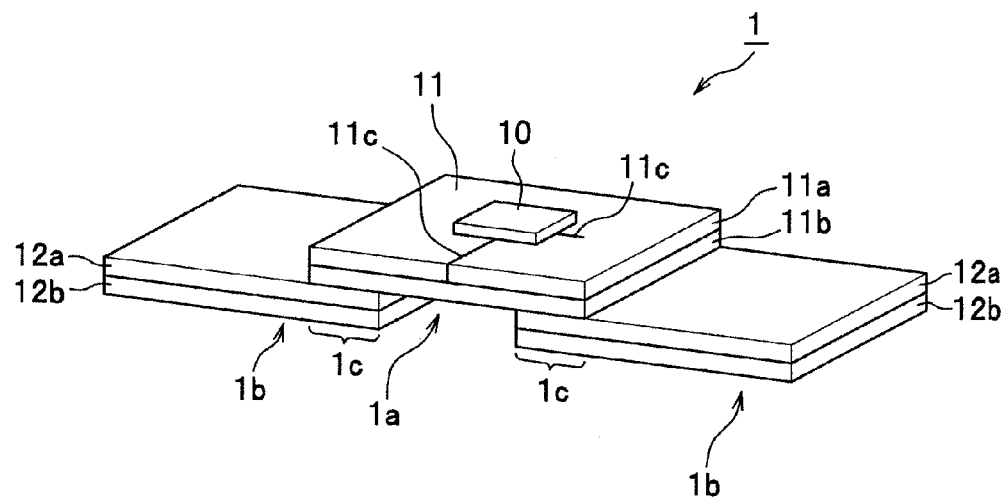
FIG. 1A shows an RFID tag in its assembled state, as a first embodiment of this invention.
Figure 1B:
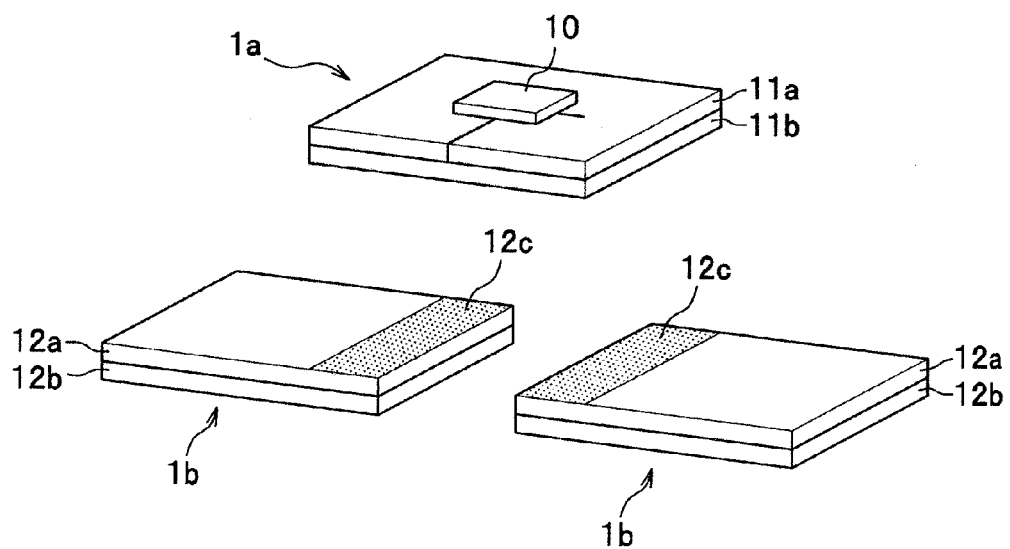
FIG. 1B shows, in its disassembled state, the RFID tag shown as the first embodiment of this invention in FIG. 1A.

FIGS. 1A and 1B show an RFID tag as a first embodiment of this invention, FIG. 1A showing the RFID tag in its assembled state and FIG. 1B showing the same in its disassembled state.

As shown in FIGS. 1A and 1B, the RFID tag (IC tag) 1 as the first embodiment of this invention is composed of an inlet 1a consisting of an antenna (first antenna) 11 as the main antenna and an IC chip 10 mounted thereon, and two conductor pieces (second antennas) 1b, 1b as the auxiliary antennas.

The antenna 11 is a metal film layer 11a of Au or Al having a thickness of several micrometers (μm), formed on a roughly rectangular base 11b of insulating material such as PET (polyethylene terephthalate) resin or PEN (polyethylene naphthalate) resin by vapor deposition using sputtering. The metal film layer 11a is provided with a slit 11c. The formation of the metal film layer 11a is not limited to the use of vapor deposition. For example, it may be formed with Au or Al metal paste printed on a substrate by means of an inkjet printer. The slit 11c may be formed simultaneously with or after the formation of the metal film layer 11a.

The material for the base 11b is not limited to such insulating resins as mentioned above, but may be any insulating material such as paper, rubber, glass, etc. In such a case, the metal film layer 11a may be appropriately formed, for example, through the printing of Au or Al metal paste by means of an inkjet printer or the application of Au or Al metal foil.

Figure 2A:
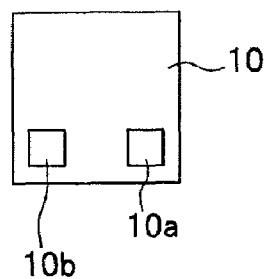
FIG. 2A schematically shows an IC chip used in the RFID tag, as viewed from the side of the signal input/output electrodes.
Figure 2B:
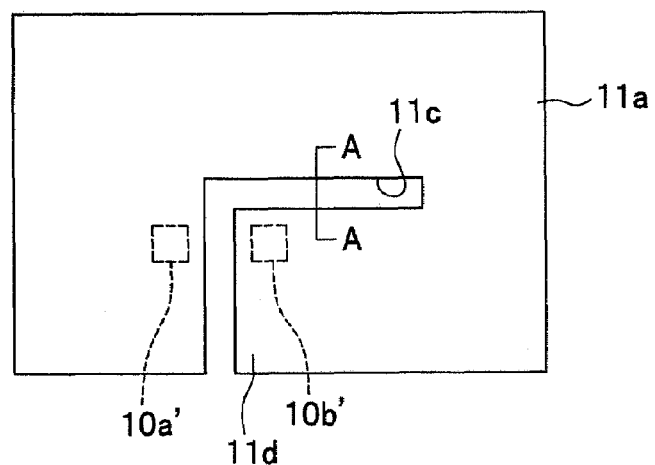
FIG. 2B shows the positional relationship between the slit in a metal film layer and the signal input/output electrodes of the IC chip.
Figure 2C:
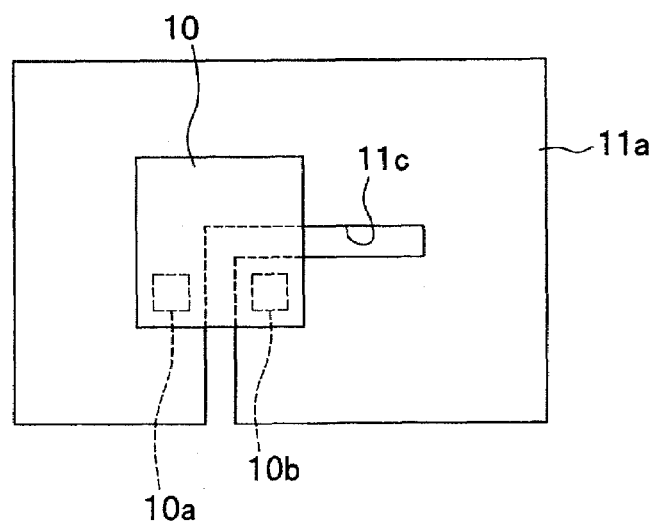
FIG. 2C shows the metal film layer with the IC chip mounted thereon.

FIGS. 2A, 2B and 2C illustrate how the IC chip is mounted on the metal film layer, FIG. 2A showing the IC chip as viewed from the side of its signal input/output electrodes, FIG. 2B showing the positional relationship between the slit in the metal film layer and the signal input/output electrodes of the IC chip, and FIG. 2C showing the metal film layer with the IC chip mounted thereon.

The slit 11c provided in the metal film layer 11a has a shape similar to capital letter "L" as seen in FIG. 2B. The signal input/output electrodes 10a and 10b (see FIG. 2A) of the IC chip 10 serving as the antenna feeder terminals rest respectively on the positions 10a' and 10b' on the metal film layer 11a indicated by the corresponding dashed line squares located near the right-angled bend of the slit 11c, as shown in FIG. 2B. Thus, the IC chip 10 is mounted on the metal film layer 11a as shown in FIG. 2C.

The signal input/output electrodes 10a and 10b of the IC chip 10 may be Au pads and the electric connection between the metal film layer 11a and the pads is made through ultrasonic welding or metal eutectic junction. Alternatively, the electric connection between the metal film layer 11a and the signal input/output electrodes 10a and 10b may be made with an anisotropic conductive film interposed between them.

The slit 11c is formed during the process of forming the metal film layer 11a by using the masking technique forming a groove having a shape of "L" in plan view. As indicated by line A-A in FIG. 2B, the part of the metal film layer 11a where the slit 11c exists is void of electric conduction. One branch of the "L" shaped slit 11c extends along the width of the metal film layer 11a and reaches the edge thereof while the other branch having a predetermined length extends along the length of the metal film layer 11a and terminates short of the lengthwise edge thereof.

As described above, the signal input/output electrodes 10a and 10b are electrically connected with the metal film layer 11a at the two points located on both sides of the slit 11c as shown in FIG. 2C. In this structure, the stub 11d (shown in FIG. 2B) formed by providing the slit 11c in the metal film layer 11a and the part of the metal film layer 11a except the stub 11d, which serves as the antenna 11, are connected in series between the input/output electrodes 10a and 10b of the IC chip 10. Thus, the stub 11d serves as a series-connected inductive component. The inductive component can offset the capacitive component in the IC chip 10 so that impedance matching between the metal film layer 11a and the IC chip 10 can be effected. Accordingly, a sufficient area of the metal film layer 11a can serve as the antenna for the IC chip 10. In addition, impedance matching between the IC chip 10 and the antenna 11 formed of the metal film layer 11a can be effected. Such a slit 11c as described above is called an impedance matching circuit. The degree of impedance matching between the IC chip 10 and the part of the metal film layer 11a serving as the antenna 11 depends on the area of the stub 11d defined by the lengths of the branches of the L-shaped slit 11c.

When the IC chip 10 is mounted on the metal film layer 11a, the electric connection between them can be made by applying anisotropic conductive films on the pads forming the signal input/output electrodes 10a and 10b of the IC chip 10 or on the corresponding positions on the metal film layer 11a, and then by bringing the IC chip 10 and the metal film layer 11a in contact with each other.

Figure 3A:
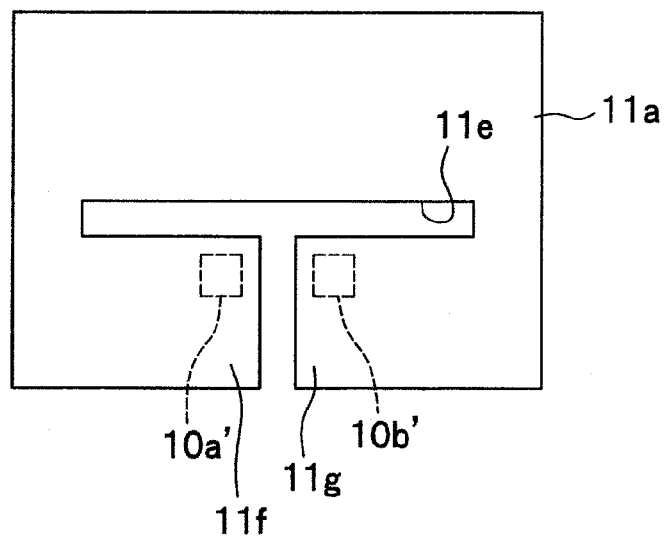
FIG. 3A shows the positional relationship between the T-shaped slit in the metal film layer and the signal input/output electrodes of the IC chip.
Figure 3B:
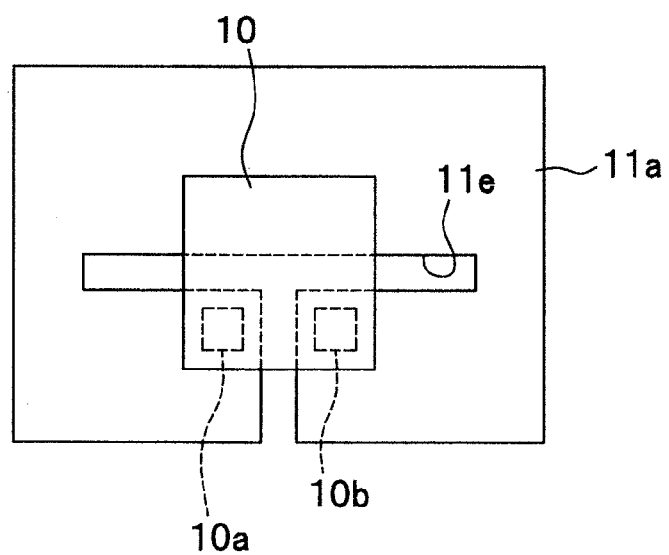
FIG. 3B shows the metal film layer with the IC chip mounted thereon.

The planar shape of the slit serving as the impedance matching circuit is not limited to the shape of "L", but may be changed into the shape of "T". FIGS. 3A and 3B show an example where an IC chip is mounted on a metal film layer having a T-shaped slit. FIG. 3A shows the positional relationship between the T-shaped slit provided in the metal film layer and the signal input/output electrodes of the IC chip and FIG. 3B shows the metal film layer and the IC chip mounted thereon.

As shown in FIG. 3A, the metal film layer 11a is provided with a T-shaped slit 11e. In this case, the vertical branch of the T-shaped slit lie extends along the width of the metal film layer 11a and reaches the edge thereof. The horizontal branch having a predetermined length, of the T-shaped slit 11e extends along the length of the metal film layer 11a and both the ends of the horizontal branch end short of the lengthwise edges. As a result, stubs 11f and 11g are formed.

As shown in FIG. 3B, the IC chip 10 is mounted on the metal film layer 11a in such a manner that the signal input/output electrodes 10a and 10b of the IC chip 10 serving as the antenna feeder terminals rest respectively on the corresponding positions 10a' and 10b' on the stubs 11f and 11g indicated by dashed squares located on both sides of the vertical branch of the T-shaped slit lie near the junction of the horizontal and vertical branches of the T-shaped slit 11e.

As described above, an inlet 1a (shown in FIG. 1A) is constructed by mounting the IC chip 10 on the metal film layer 11a serving as the antenna 11.

Back to FIG. 1A, each of the conductor pieces 1b is a metal film layer 12a of Au or Al having a thickness of several micrometers (μm), formed on a roughly rectangular base 12b of insulating material such as PET resin or PEN resin by vapor deposition using sputtering. The formation of the metal film layer 12a is not limited to the use of vapor deposition. It may be formed, for example, with Au or Al metal paste printed on the base 12b by means of an inkjet printer.

The material for the base 12b is not limited to such insulating resins as mentioned above, but may be any insulating material such as paper, rubber, glass, etc. In such a case, the metal film layer 12a may be appropriately formed, for example, through the printing of Au or Al metal paste by means of an inkjet printer or the application of Au or Al metal foil.

An RFID tag 1 is constructed by connecting the two conductor pieces 1b, 1b with both the ends of an inlet 1a. As shown in FIG. 1B, each conductor piece 1b has a connecting part 12c near its inner end on the metal film layer 12a. In completing the assembly of the RFID tag 1, both the lengthwise ends of the inlet 1a are connected with the connecting parts 12c of the conductor pieces 1b, 1b in such a manner that the metal film layer 11a of the inlet 1a and the metal film layer 12a of each conductor piece 1b overlap each other in the overlapping area 1c. The inlet 1a and the conductor pieces 1b, 1b can be bonded together with, for example, resin or adhesive agent.

It has been revealed in this first embodiment of the invention that the most efficient operation can be achieved if the length of the inlet 1a is set to ¼-⅙ of the wavelength of radio waves used for the communication of information while the part of the slit 11c extending along the lengthwise direction of the metal film layer 11a is set to 3.5 mm. In this embodiment, since the frequency of the radio waves used for the communication of information is 2.45 GHz, the length of the inlet 1a is set to 25 mm. For the radio waves of 2.45 GHz, it is observed that the RFID tag 1 operates most efficiently if its entire length is 40 mm.

It has been further revealed that if radio waves of 2.45 GHz are used, the best choice of the length of the connecting part 12c along the lengthwise direction of the conductor piece 1b (hereafter referred to as connection length) should be 3 mm~10 mm. Accordingly, the connection length is chosen to be about 7 mm in this embodiment. The length of the conductor piece 1b is chosen to be 15 mm. It should be noted that the connection length is so determined that the connecting part does not overlap the slit 11c.

As described above, an RFID tag 1 having the overall length of 40 mm is constructed as the first embodiment of this embodiment, with the length of the inlet 1a equal to 25 mm, the length of each conductor piece 1b 15 mm, and the connection length 7 mm. And experiments have proved that the thus constructed RFID tags 1 have no practical problem and that radio wave interference does not occur even when they are piled up one upon another. It should here be noted that the concrete values mentioned above are merely by way of example and therefore that they may be chosen appropriately since they change depending on the wavelength of radio waves used for the communication of information, the shape of the slit provided in the antenna, and the material for the bases 11b and 12b.

As described above, the RFID tag 1 as the first embodiment of this invention is composed of the inlet 1a serving as the first antenna (main antenna) and the conductor pieces 1b, 1b serving as the second antenna (auxiliary antenna). A part of the metal film layer 11a of the inlet 1a serving as the antenna 11 and a part of the metal film layer 12a of the conductor piece 1b are bonded together with the base 11b of insulating material interposed between them in an overlapping area. This structure enables an electrostatic capacitive coupling between the antenna 11 and the conductor pieces 1b, 1b.

When an RFID tag 1 having such a structure as described above is stacked on another RFID tag of the same structure, the conductor pieces 1b, 1b of one RFID tag 1 function as the auxiliary antenna of the antenna 11 serving as the first antenna of the other RFID tag 11. Accordingly, the impedance of the antenna 11 of each RFID tag 1 does not suffer a large change.

Even if plural RFID tags 1 having the structure according to the first embodiment of this invention are stacked one upon another, radio waves radiated from the RFID tags 1 hardly interfere with one another. Therefore, the reader/writer (not shown) seldom suffer from erroneously reading desired information. This is a great advantage of the RFID tag 1 according to the first embodiment of this invention. Further, even in case where envelopes, each of which has the RFID tag 1 according to the first embodiment of this invention adhered thereto, are piled up one upon another, the pile can be prevented from being too bulky since there is no need of spacers which must otherwise be inserted between envelopes. This is another great advantage of the RFID tag 1 according to the first embodiment of this invention.

Second Embodiment

Figure 4A:
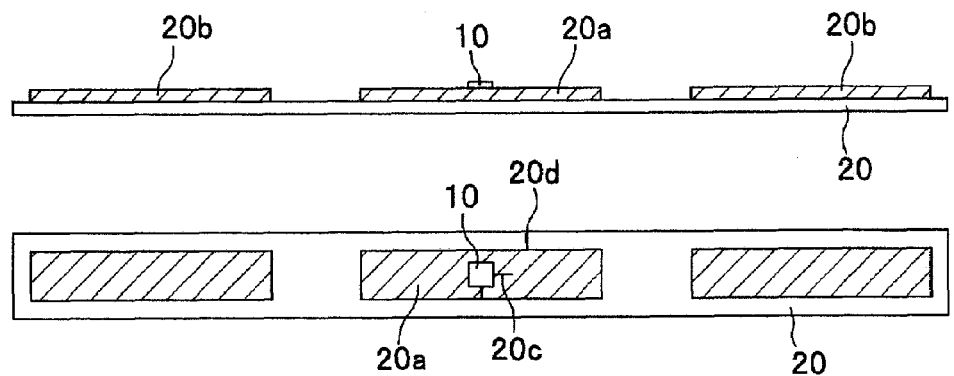
FIG. 4A shows metal film layers formed on a belt-like base material.
Figure 4B:
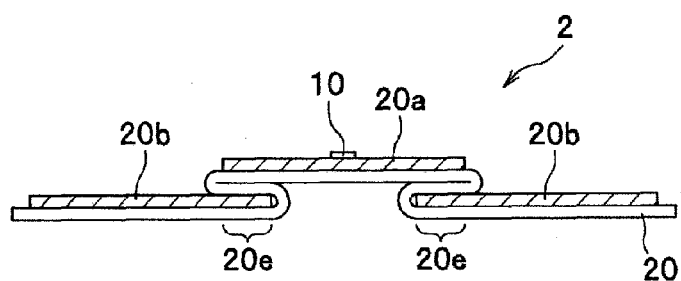
FIG. 4B shows an RFID tag as a second embodiment of this invention, wherein the base material as shown in FIG. 4A is folded.
Figure 4C:
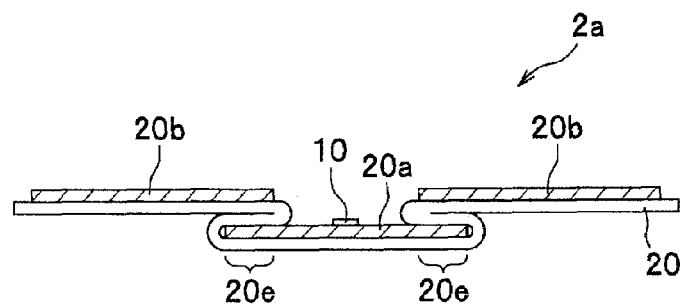
FIG. 4C shows an RFID tag as a modification of the second embodiment of this invention.

FIGS. 4A, 4B and 4C show the structure of an RFID tag as a second embodiment of this invention. FIG. 4A shows a belt-like base with a metal film layer formed thereon; FIG. 4B shows an RFID tag as a second embodiment of this invention, which is built by folding the belt-like base; and FIG. 4C shows a variation of the second embodiment shown in FIG. 4B.

As shown in FIG. 4A, in the second embodiment of this invention, two metal film layers (second antennas) 20b, 20b of Au or Al having a thickness of several micrometers (μm) are formed on the belt-like base 20 of insulating material such as PET resin or PEN resin, separated from each other along the lengthwise direction the belt-like base 20, by vapor deposition using sputtering. Further, a metal film layer 20a is formed between the separated metal film layers 20b, 20b by using the same technique. The formation of the metal film layers 20a and 20b, 20b are not limited to the use of vapor deposition. They may be formed, for example, with Au or Al metal paste printed on the base 20 by means of an inkjet printer.

Like the metal film layer 11a (see FIG. 2B) as the first embodiment of this invention, the metal film layer 20a is provided with a slit 20c to form an antenna (first antenna) 20d serving as the main antenna. Then, an IC chip 10 is mounted on the metal film layer 20a, as in case of the metal film layer 11a of the RFID tag 1 shown in FIG. 2C.

As in case of the first embodiment described above, the material for the base 20 is not limited to such insulating resins as mentioned above, but may be any insulating material such as paper, rubber, glass, etc. In such a case, the metal film layers 20b, 20a and 20b may be appropriately formed, for example, through the printing of Au or Al metal paste by an inkjet printer or the application of Au or Al metal foil.

Like the metal film layer 11a shown as the first embodiment of this invention in FIG. 2B, the metal film layer 20a is provided with the slit 20c having the shape of "L", but the shape of the slit 20c may be changed into the shape of, for example, "T" as shown in FIG. 3A.

In completing the desired structure of the RFID tag 2 shown in FIG. 4B, the base 20 with the three metal film layers 20b, 20a and 20b formed thereon is folded between the leftmost metal film layer 20b and the central metal film layer 20a and between the central metal film layer 20a and the rightmost metal film layer 20b, so that the metal film layer 20a overlaps partially with the metal film layers 20b, 20b in the overlapping areas 20e, 20e, with the metal film layer 20a lying above the metal film layers 20b, 20b. The folded base 20 may be bonded together and to the metal film layers 20b, 20b with resin or adhesive agent in the overlapping areas 20e, 20e. In this second embodiment, the material for the base 20 should preferably be foldable (e.g. flexible like a thin film). If the base 20 is made of glass, it can be folded while it is being kept at high temperatures.

The metal film layer 20b and the part of the base 20 carrying the metal film layer 20b thereon, of the RFID tag 2 shown in FIG. 4B correspond to the conductor piece 1b of the RFID tag 1 shown in FIG. 1A. In like manner, the metal film layer 20a and the part of the base 20 carrying the metal film layer 20a thereon, of the RFID tag 2 shown in FIG. 4B correspond to the inlet 1a of the RFID tag 1 shown in FIG. 1A.

Like the first embodiment described above, this embodiment adopts 2.45 GHz for the frequency of the radio waves used for the communication of information, 25 mm for the length of the metal film layer 20a corresponding to the inlet 1a of the RFID tag 1 shown in FIG. 1A, and 15 mm for the length of the metal film layer 20b corresponding to the conductor piece 1b of the RFID tag 1 shown in FIG. 1A.

Further, the overall length of the RFID tag 2 shown in FIG. 4B is 40 mm just like that of the RFID tag 1.

Since the overlapping area 20e corresponds to the connecting part 12c (see FIG. 1B), the length of the overlapping area 20e is set to about 7 mm, equal to the connection length of the connecting part 12c (see FIG. 1B). The length of the overlapping area 20e should so adjusted that the overlapping area 20e may not overlap the slit 20c when the base 20 is folded. Accordingly, the distance between the metal film layer 20a and the metal film layer 20b is adjusted to be about 7 mm when they are formed on the belt-like base 20.

As described above, the RFID tag 2 having the overall length of 40 mm as the second embodiment of this invention is completed wherein the length of the metal film layer 20a is 25 mm, the length of the metal film layer 20b is 15 mm, and the length of the overlapping area 20e is about 7 mm. Experiments have proved that the thus constructed RFID tags 2 have no practical problem and that radio wave interference does not occur even when they are piled up one upon another. As with the first embodiment described above, the concrete values mentioned above are merely by way of example and therefore they may be chosen appropriately since they change depending on the wavelength of radio waves used for the communication of information, the shape of the slit 20c provided in the metal film layer 20a, and the material for the base 20.

In this way, the RFID tag 2 as the second embodiment of this invention is composed of the metal film layer 20a forming the antenna 20d serving as the first antenna and the metal film layers 20b, 20b serving as the second antenna. Moreover, a part of the metal film layer 20a overlaps a part of the metal film layer 20b with the base 20 of insulating material interposed between them. This structure enables an electrostatic capacitive coupling between the antenna 20d and the metal film layers 20b, 20b.

When an RFID tag 2 having such a structure as described above is stacked on another RFID tag 2 of the same structure, the metal film layers 20b, 20b of one RFID tag 2 function as the auxiliary antenna of the antenna 20d serving as the first antenna of the other RFID tag 2. Accordingly, the impedance of the antenna 20d of each RFID tag 2 does not suffer a large change.

Even if plural RFID tags 2 having the structure according to the second embodiment of this invention are stacked one upon another, radio waves radiated from the RFID tags 2 hardly interfere with one another. Therefore, the reader/writer (not shown) seldom causes an error in reading desired information. This is the same advantage of the RFID tag 2 as that of the RFID tag 1 according to the first embodiment of this invention. Further, even in case where envelopes, each of which has the RFID tag 2 according to the second embodiment of this invention adhered thereto, are piled up one upon another, the pile can be prevented from being too bulky since there is no need of spacers which must otherwise be inserted between envelopes. This is another advantage of the RFID tag 2, which is still comparable to that of the RFID tag 1 according to the first embodiment of this invention.

Furthermore, according to this second embodiment, the metal film layers 20b, 20a and 20b can be successively formed on the belt-like base 20, and the RFID tag 2 can be constructed by simply folding the base 20. Thus, this second embodiment excels the first embodiment in that there are fewer steps in the process of fabricating an RFID tag. It will be needless to say that the same effect or advantage can be obtained with an RFID tag 2a wherein the base 20 is so folded that the metal film layer 20a carrying the IC chip 10 thereon lies below the metal film layers 20b, 20b serving as the second antenna, as shown in FIG. 4C.

Third Embodiment

Figure 5A:
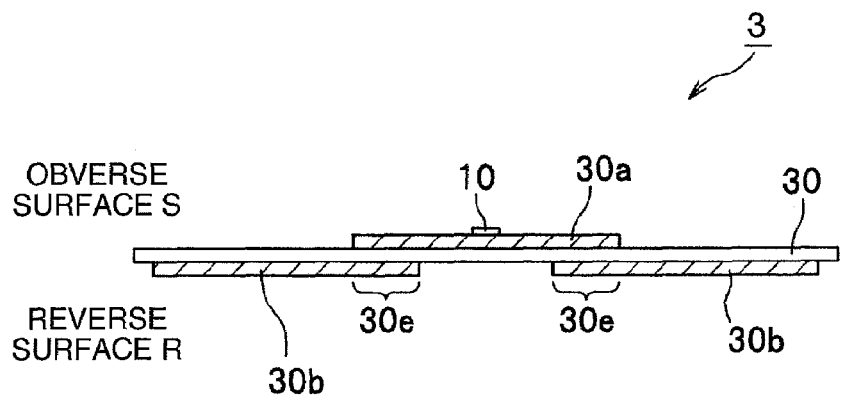
FIG. 5A is the side view of an RFID tag as a third embodiment of this invention.
Figure 5B:
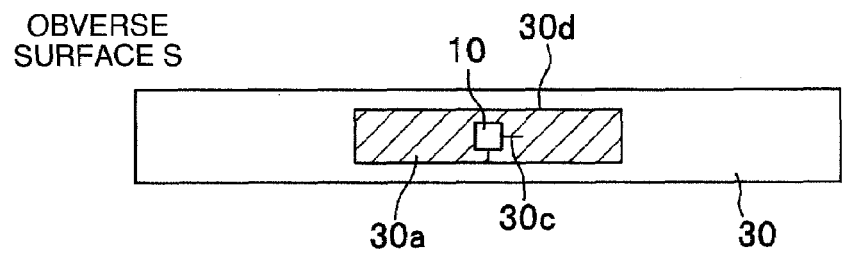
FIG. 5B is the obverse view of the RFID tag shown in FIG. 5A as the third embodiment of this invention.
Figure 5C:
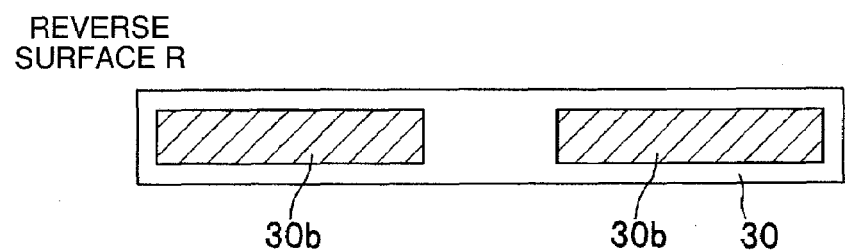
FIG. 5C is the reverse view of the RFID tag shown in FIG. 5A as the third embodiment of this invention.

FIGS. 5A, 5B and 5C show the structure of an RFID tag as a third embodiment of this invention. FIG. 5A is the side view of the RFID tag as the third embodiment of this invention, FIG. 5B is the top view of the RFID tag as the third embodiment of this invention, and FIG. 5C is the bottom view of thr RFID tag as the third embodiment of this invention.

As shown in FIG. 5B, in the third embodiment of this invention, a metal film layer 30a of Au or Al having a thickness of several micrometers (μm) is formed on one surface (hereafter referred to as top or obverse surface) S of a belt-like base 30 of insulating material such as PET resin or PEN resin by vapor deposition using sputtering. Then, as shown in FIG. 5C, two metal film layers 30b, 30b of Au or Al having a thickness of several micrometers (μm) are formed on the other surface (hereafter referred to as bottom or reverse surface) R of the belt-like base 20, separated from each other along the lengthwise direction of the belt-like base 30, by vapor deposition using sputtering. The positional relationship between the metal film layer 30a and the metal film layers 30b, 30b is such that the outer ends of the metal film layer 30a overlap the inner ends of the metal film layers 30b, 30b in the overlapping areas 30e as shown in FIG. 5A. The formation of the metal film layers 30a and 30b, 30b is not limited to the use of vapor deposition. They may be formed, for example, with Au or Al metal paste printed on the base 30 by means of an inkjet printer.

Back to FIG. 5B, the metal film layer 30a formed on the obverse surface S of the base 30 is provided with a slit 30c, as in case of the metal film layer 11a (see FIG. 2B) in the first embodiment of this invention, so that an antenna (first antenna) 30d may be defined. Further, an IC chip 10 is mounted on the metal film layer 30a, as in case of the metal film layer 11a of the RFID tag 1 shown in FIG. 2C.

As in case of the first embodiment, the material for the base 30 is not limited to such insulating resins as mentioned above, but may be any insulating material such as paper, rubber, glass, etc. In such a case, the metal film layers 30b, 30a and 30b may be appropriately formed, for example, through the printing of Au or Al metal paste by an inkjet printer or the application of Au or Al metal foil.

Like the metal film layer 11a shown as the first embodiment of this invention in FIG. 2B, the metal film layer 30a is provided with the slit 30c having the shape of "L". The shape of the slit 30c is not limited to that of "L", but may be changed into the shape of, for example, "T" as shown in FIG. 3A.

As described above, the RFID tag 3 is constructed by forming the metal film layer 30a on the obverse surface S of the base 30 and the two metal film layers 30b, 30b on the reverse surface R of the base 30, as shown in FIG. 5A.

With respect to the RFID tag 3 shown in FIG. 5A, the part of the obverse surface S of the base 30 carrying the metal film layer 30a thereon corresponds to the inlet 1a of the RFID tag 1 shown in FIG. 1A, and the parts of the reverse surface R of the base 30 carrying the metal film layers 30b, 30b thereon correspond to the conductor pieces 1b, 1b shown in FIG. 1A.

Like the first embodiment described above, this third embodiment adopts 2.45 GHz for the frequency of the radio waves used for the communication of information, 25 mm for the length of the metal film layer 30a corresponding to the inlet 1a of the RFID tag 1 shown in FIG. 1A, and 15 mm for the length of the metal film layer 30b corresponding to the conductor piece 1b of the RFID tag 1 shown in FIG. 1A.

Further, the overall length of the RFID tag 3 shown in FIG. 5A is adjusted to 40 mm just like that of the RFID tag 1 shown in FIG. 1A.

Since the overlapping area 30e corresponds to the connection length of the connecting part 12c of the RFID tag 1 (see FIG. 1B), the length of the overlapping area 20e is set to about 7 mm, equal to the connection length of the connecting part 12c of the RFID tag 1 (see FIG. 1B). The length of the overlapping area 30e should so adjusted that the overlapping area 30e may not overlap the slit 20c.

As described above, the RFID tag 3 having the overall length of 40 mm, as the third embodiment of this invention, is constructed wherein the length of the metal film layer 30a is 25 mm, the length of the metal film layer 30b is 15 mm, and the length of the overlapping area 30e is about 7 mm. Experiments have proved that the thus constructed RFID tags 3 have no practical problem and that radio wave interference does not occur even when they are piled up one upon another. As with the first embodiment described above, these concrete values mentioned above are by way of example and therefore they may be chosen appropriately since they change depending on the wavelength of radio waves used for the communication of information, the shape of the slit 30c provided in the metal film layer 30a, and the material for the base 30.

In this way, the RFID tag 3 as the third embodiment of this invention is composed of the metal film layer 30a forming the antenna 30d serving as the first antenna and the metal film layers 30b, 30b serving as the second antenna. Moreover, a part of the metal film layer 30a overlaps a part of the metal film layer 30b with the base 30 of insulating material interposed between them in the overlapping area 30a. This structure enables an electrostatic capacitive coupling between the metal film layer 30a and the metal film layers 30b, 30b.

When an RFID tag 3 having such a structure as described above is stacked on another RFID tag 3 of the same structure, the metal film layers 30b, 30b of one RFID tag 3 function as the auxiliary antenna of the antenna 30d serving as the first antenna of the other RFID tag 3. Accordingly, the impedance of the antenna 30d of each RFID tag 3 does not suffer a large change.

Even if plural RFID tags 3 having the structure according to the third embodiment of this invention are stacked one upon another, radio waves radiated from the RFID tags 3 hardly interfere with one another. Therefore, the reader/writer (not shown) seldom causes an error in reading desired information. This is the same advantage of the RFID tag 3 as that of the RFID tag 1 according to the first embodiment of this invention. Further, even in case where envelopes, each of which has the RFID tag 3 according to the third embodiment of this invention adhered thereto, are piled up one upon another, the pile can be prevented from being too bulky since there is no need of spacers which must otherwise be inserted between the envelopes. This is another advantage of the RFID tag 3, which is comparable to that of the RFID tag 1 according to the first embodiment of this invention.

Furthermore, according to this third embodiment, since the RFID tag 3 can be constructed by forming the metal film layers 30b, 30a and 30b successively on both the surfaces of the belt-like base 30, this third embodiment excels the first embodiment in that there are fewer steps in the process of fabricating an RFID tag.

Fourth Embodiment

Figure 6A:
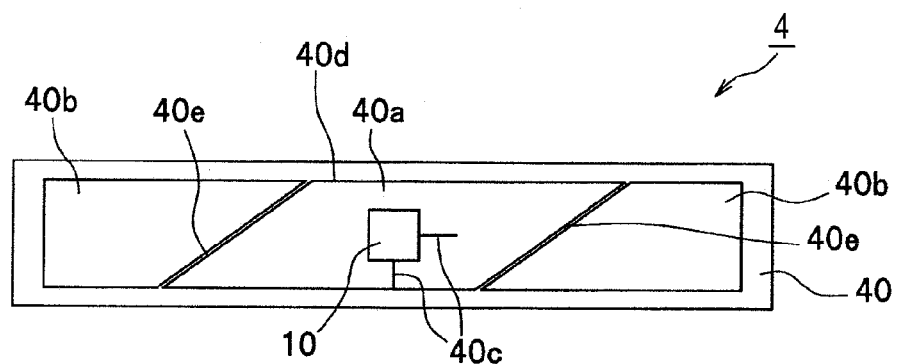
FIG. 6A is the plan view of an RFID tag as a fourth embodiment of this invention.
Figure 6B:
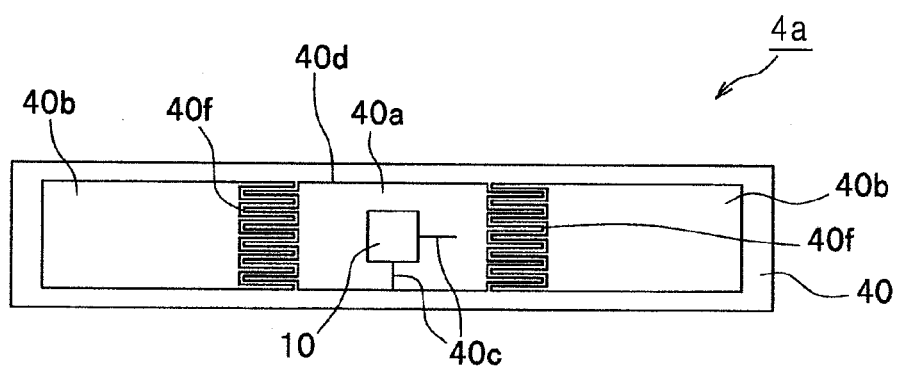
FIG. 6B is the plan view of an RFID tag as a modification of the fourth embodiment of this invention.

FIGS. 6A and 6B show the structure of an RFID tag as a fourth embodiment of this invention, FIG. 6A being the plan view of the RFID tag as the fourth embodiment of this invention, and FIG. 6B being the plan view of an RFID tag as a modification of the fourth embodiment of this invention.

As shown in FIG. 6A, in the fourth embodiment of this invention, metal film layer 40a of Au or Al having a thickness of several micrometers ($\mu$m) is formed on the base 40 of insulating material such as PET resin or PEN resin by vapor deposition using sputtering. Further, fine gaps 40e are provided near both ends of the metal film layer 40a. As a result, the metal film layer 40a is split into three parts by the gaps 40e, 40e, and the two outer metal film layers 40b, 40b function as the second antenna. The formation of the metal film layer 40a is not limited to the use of vapor deposition. It may be formed, for example, with Au or Al metal paste printed on the base 40 by means of an inkjet printer.

Like the metal film layer 11a (see FIG. 2B) as the first embodiment of this invention, the metal film layer 40a is provided with a slit 40c to form an antenna 40d. Then, an IC chip 10 is mounted on the metal film layer 40a, as in case of the metal film layer 11a of the RFID tag 1 shown in FIG. 2C.

As in case of the first embodiment described above, the material for the base 40 is not limited to such insulating resins as mentioned above, but may be any insulating material such as paper, rubber, glass, etc. In such a case, the metal film layers 40b, 40a and 40b may be appropriately formed, for example, through the printing of Au or Al metal paste by an inkjet printer or the application of Au or Al metal foil.

Like the metal film layer 11a shown as the first embodiment of this invention in FIG. 2B, the metal film layer 40a is provided with the slit 40c having the shape of "L". The shape of the slit 40c is not limited to that of "L", but may be changed into the shape of, for example, "T" as shown in FIG. 3A.

As described above, the RFID tag 4 shown in FIG. 6A is constructed by forming the metal film layer 40a on the base 40 and providing the fine gaps 40e in the metal film layer 40a so as to electrically separate the metal film layers 40b, 40b from the metal film layer proper 40a.

This structure wherein the two metal film layers 40b, 40b are disposed on both sides of the metal film layer 40a serving as the antenna 40d, with the fine gaps 40e separating the two metal film layers 40b, 40b from the metal film layer 40a, enables an electrostatic capacitive coupling between the antenna 40d and the two metal film layers 40b, 40b. As a result, the metal film layers 40b, 40b function as an auxiliary antenna for the antenna 40d. It is known that if the gap width of the fine gap 40e is not more than 1 mm, the effect of the above mentioned electrostatic capacitive coupling can be secured. In this fourth embodiment, the gap width is adjusted to 100 $\mu$m.

Since the capacitance of the electrostatic capacitive coupling is determined depending on the cross sectional areas exposed oppositely in the fine gap 40e, of the metal film layer 40a and the metal film layer 40b, then the fine gaps 40e are formed in a slant direction with respect to the direction of the width of the metal film layer 40a. Here, the cross sectional area is meant to be the product of the thickness of the metal film layer 40a and the length of the fine gap 40e. If the degree in slanting of the fine gap 40e increases, the cross sectional area increases, too, increasing the electrostatic capacitance. Therefore, the slant fine gaps 40e are adopted to properly adjust the electrostatic capacitance.

Like the first embodiment described above, this fourth embodiment adopts 2.45 GHz for the frequency of the radio waves used for the communication of information; 40 mm for the overall length of the RFID tag 4 shown in FIG. 6A, just like that of the RFID tag 1 shown in FIG. 1A; and 25 mm for the length of the metal film layer 40a corresponding to the inlet 1a of the RFID tag 1 shown in FIG. 1A.

As described above, the RFID tag 4 having the overall length of 40 mm, as the fourth embodiment of this invention, is constructed wherein the length of the metal film layer 40a is 25 mm, and the gap width of the fine gap 40e is 100 μm. Experiments have proved that the thus constructed RFID tags 4 have no practical problem and that radio wave interference does not occur even when they are piled up one upon another. As with the first embodiment described above, these concrete values mentioned above are by way of example and therefore they may be chosen appropriately since they change depending on the wavelength of radio waves used for the communication of information, the shape of the slit 40c provided in the metal film layer 40a, and the material for the base 40.

In this way, the RFID tag 4 as the fourth embodiment of this invention is composed of the metal film layer 40a forming the antenna 40d serving as the first antenna and the metal film layers 40b, 40b serving as the second antenna. Moreover, since the metal film layer 40a and the metal film layer 40b are brought into electrostatic capacitive coupling with each other with the fine gap 40e between them, the antenna 40d and the metal film layers 40b, 40b are in capacitive coupling.

When an RFID tag 4 having such a structure as described above is stacked on another RFID tag 4 of the same structure, the metal film layers 40b, 40b of one RFID tag 4 function as the auxiliary antenna of the antenna 40d serving as the first antenna of the other RFID tag 4. Accordingly, the impedance of the antenna 40d of each RFID tag 4 does not suffer a large change.

Even if plural RFID tags 4 having the structure according to the fourth embodiment of this invention are stacked one upon another, radio waves radiated from the RFID tags 4 hardly interfere with one another. Therefore, the reader/writer (not shown) seldom causes an error in reading desired information. This is the same advantage of the RFID tag 4 as that of the RFID tag 1 according to the first embodiment of this invention. Further, even in case where envelopes, each of which has the RFID tag 4 according to the fourth embodiment of this invention adhered thereto, are piled up one upon another, the pile can be prevented from being too bulky since there is no need of spacers which must otherwise be inserted between the envelopes. This is another advantage of the RFID tag 4, which is comparable to that of the RFID tag 1 according to the first embodiment of this invention.

Furthermore, according to this fourth embodiment, since the RFID tag 4 can be constructed by disposing the two metal film layers 40b, 40b on both sides of the metal film layer 40a serving as the antenna 40d, with the fine gaps 40e separating the two metal film layers 40b, 40b from the metal film layer 40a, then this fourth embodiment is greatly advantageous over the first embodiment in that the thickness of the pile of envelopes can further be decreased.

In this fourth embodiment, the gaps 40e are made slanting with respect to the width direction of the metal film layer 40a so as to make the gaps 40e, 40e sufficiently long for the purpose. However, the shape of the fine gap 40e is not limited to that slanting linear one as shown in FIG. 6A, but a gap 40f of, for example, rectangular waveform as shown in FIG. 6B may be used to obtain a sufficiently large gap length.

Moreover, the metal film layers 40b, 40b are brought into existence by forming the metal film layer 40a on the base 40 and then processing the metal film layer 40a through an additional treatment such as etching. Accordingly, this fourth embodiment has a great advantage that there are fewer steps in the procedure of fabricating the RFID tag 4.

In order to improve the precision in reading the desired information by the reader/writer not shown, the gap 40e or 40f must provide electrostatic capacitance larger than a certain value. The electrostatic capacitance of the gap 40e or 40f can be increased by decreasing the gap width. However, very high precision is required to provide a very fine gap between the metal film layers 40a and 40b without causing erroneous bridging between the metal film layers 40a and 40b. In this fourth embodiment, the gap 40e slanting with respect to the width direction of the metal film layer 40a as shown in FIG. 6A or the gap 40f of rectangular waveform as shown in FIG. 6B are provided so that they may have electrostatic capacitance larger than a certain value. With this structure of the gap 40e or 40f, desired electrostatic capacitance can be obtained without providing extremely narrow gaps with very high precision. This is another advantage of this embodiment.

As described hitherto, the RFID tags according to this invention have a great advantage that even if they are stacked one upon another, radio waves radiated from them hardly interfere with one another so that the reader/writer seldom causes an error in reading desired information. Further, the RFID tags according to this invention have another great advantage that even when they are piled up one upon another, the pile can be prevented from being too bulky since there is no need of spacers which must otherwise be inserted between them.

The overall length of the RFID tag according to this invention need not be limited to 40 mm, but can be appropriately adjusted for stabilized communication depending on the material, i.e. dielectric constant, of the article (e.g. envelope) to which the RFID tag is attached.

As described in the foregoing, according to this invention, the second antennas are disposed symmetric with respect to the first antenna. However, asymmetric structures may also be adopted by, for example, making the length of the one second antenna unequal to the length of the other second antenna, or by disposing only one second antenna on either side of the first antenna.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An IC tag comprising
an IC chip operable with radio waves;
a first antenna electrically connected to the IC chip; and
at least one second antenna capacitively coupled with the first antenna via an insulating material, the IC chip being connected to the first antenna over a slit formed in the first antenna used for impedance matching, the at least one second antenna being connected with the first antenna to avoid overlapping with the slit of the first antenna.

2. The IC tag as claimed in claim 1, wherein the first antenna and the at least one second antenna have their own overlapping area wherein the first antenna and the at least one second antenna overlap each other via the insulating material.

3. The IC tag as claimed in claim 1, wherein the insulating material has a belt-like shape;

two second antennas are formed on the insulating material along a lengthwise direction of the insulating material;

the first antenna is formed between the two second antennas; and the insulating material is folded toward the first antenna and folded toward the two second antennas, so that the first antenna overlaps partially with the two second antennas via the insulating material.

4. The IC tag as claimed in claim 1, wherein the insulating material has a belt-like shape;

the first antenna is formed on one surface of the insulating material;

two second antennas are formed on another surface of the insulating material along the lengthwise direction of the insulating material; and a positional relationship along the lengthwise direction of the insulating material between the first antenna and the two second antennas is such that lengthwise ends of the first antenna overlap with opposite ends of the two second antennas via the insulating material.

5. The IC tag as claimed in claim 1, wherein the first antenna and the at least one second antenna are formed on a same surface of the insulating material; and the first antenna and the at least one second antenna are separated from each other and opposed to each other via a fine gap between them.

6. A method for fabricating an IC tag comprising the steps of forming a first antenna and at least one second antenna on a base of insulating flexible material;

electrically connecting an IC chip operable with radio waves to the first antenna via a slit;

providing capacitive coupling between the first antenna and the at least one second antenna without overlapping with the slit at end portion of the first antenna and the at least one second antenna, and folding the base at a predetermined space by bending the at least one second antenna toward the first antenna and then bending back the at least one second antenna so that the end portion of the first antenna and the end portion of the at least one second antenna overlap each other with the base interposed between them so that the capacitive coupling is formed between the first antenna and the at least one second antenna and the at least one second antenna is arranged at a side of the end portion of the first antenna.

7. The IC tag as claimed in claim 1, wherein a length of the first antenna is shorter than a wave length of the radio waves.

8. The method as claimed in claim 6, wherein a length of the first antenna is shorter than a wave length of the radio waves.

* * * * *